United States Patent
Cohrs et al.

[15] 3,676,941
[45] July 18, 1972

[54] TREE EXCAVATING MACHINE

[72] Inventors: Arthur H. Cohrs, 124 Fifth Ave. North, Hopkins, Minn. 55343; Franklin T. Kresse, Route 2, Box 193, Maple Lake, Minn. 55358

[22] Filed: Sept. 24, 1969

[21] Appl. No.: 860,655

[52] U.S. Cl. .................................................37/2 R, 37/83
[51] Int. Cl. ...........................................................A01g 23/06
[58] Field of Search.................37/2, 191 A, 191 B, 83; 172/24; 214/3; 16/35; 175/89, 90

[56] References Cited

UNITED STATES PATENTS

| | | | |
|---|---|---|---|
| 2,755,570 | 7/1956 | Blackburn et al. | 37/2 R |
| 3,017,707 | 1/1962 | Sigler et al. | 37/2 R |
| 3,028,691 | 4/1962 | Jeffres | 37/2 R |
| 3,040,456 | 6/1962 | Pearce | 37/2 R |
| 996,898 | 7/1911 | Wielandt | 37/191 R |
| 1,073,325 | 9/1913 | Brown | 172/24 |
| 2,514,766 | 7/1950 | Judd | 172/24 |
| 2,769,278 | 11/1956 | Wassell | 37/2 R |
| 3,085,285 | 4/1963 | Morlik | 16/35 R |
| 3,099,098 | 7/1963 | Davis | 37/86 A |
| 3,315,384 | 4/1967 | Weyers | 37/191 A |
| 3,323,234 | 6/1967 | Pickrell | 214/3 |
| 3,488,064 | 1/1970 | Moe | 16/35 R |

Primary Examiner—Robert E. Pulfrey
Assistant Examiner—R. E. Suter
Attorney—John W. Adams

[57] ABSTRACT

A tree digger which, when mounted on the base of a tree, digs a trench inclined from the vertical about same, the distance of the trench from the tree and the depth of the trench being adjustable.

9 Claims, 4 Drawing Figures

FIG. 1

INVENTORS
ARTHUR H. COHRS
BY FRANKLIN T. KRESSE
John W. Adams
ATTORNEY

INVENTORS
ARTHUR H. COHRS
FRANKLIN T. KRESSE
BY John W. Adams
ATTORNEY

TREE EXCAVATING MACHINE

In the business of landscaping, it is desirable to have a machine to prepare trees for transplanting in order to avoid excessive manual labor. Such a machine should be easily operated and easily transported from one location to another. Trees that are transplanted often vary considerably in size and, of course, a machine to aid in transplanting trees must be usable with different size trees. Large trees, of course, must have a larger ball of dirt around the root structure than smaller trees.

The machine of the present invention is clamped to the lower base portion of a tree which is to be excavated. An endless chain with cutting teeth digs a trench while being moved circumferentially around the base of a tree. The machine is guided so as to dig a circular trench by an adjustable support arm which extends from the clamping mechanism and is mounted for rotation therearound. The depth of the trench and its distance from the tree are adjustable so that it may be used with different sized trees. The trench is dug at an angle inclined inwardly so as to facilitate removal of the ball and root structure.

The machine may be power driven around the tree with a ground-engaging drive wheel to serve the dual purpose of propelling the digging mechanism around the tree and assisting in transporting the machine from one digging location to another.

Accordingly, a general object of this invention is to provide an easily operable machine to aid in transplanting trees.

A further object of this invention is to provide a machine to aid in transplanting trees which is conveniently adjustable for different sized trees to be transplanted.

Another object of this invention is to provide a machine which digs a circular trench about the base of a tree to be transplanted and which uses the tree for support and directional control.

These and other objects and advantages of this invention will be apparent from the following description made in connection with the accompanying drawings wherein like reference characters refer to similar parts throughout the several views, and in which.

Figure 1:
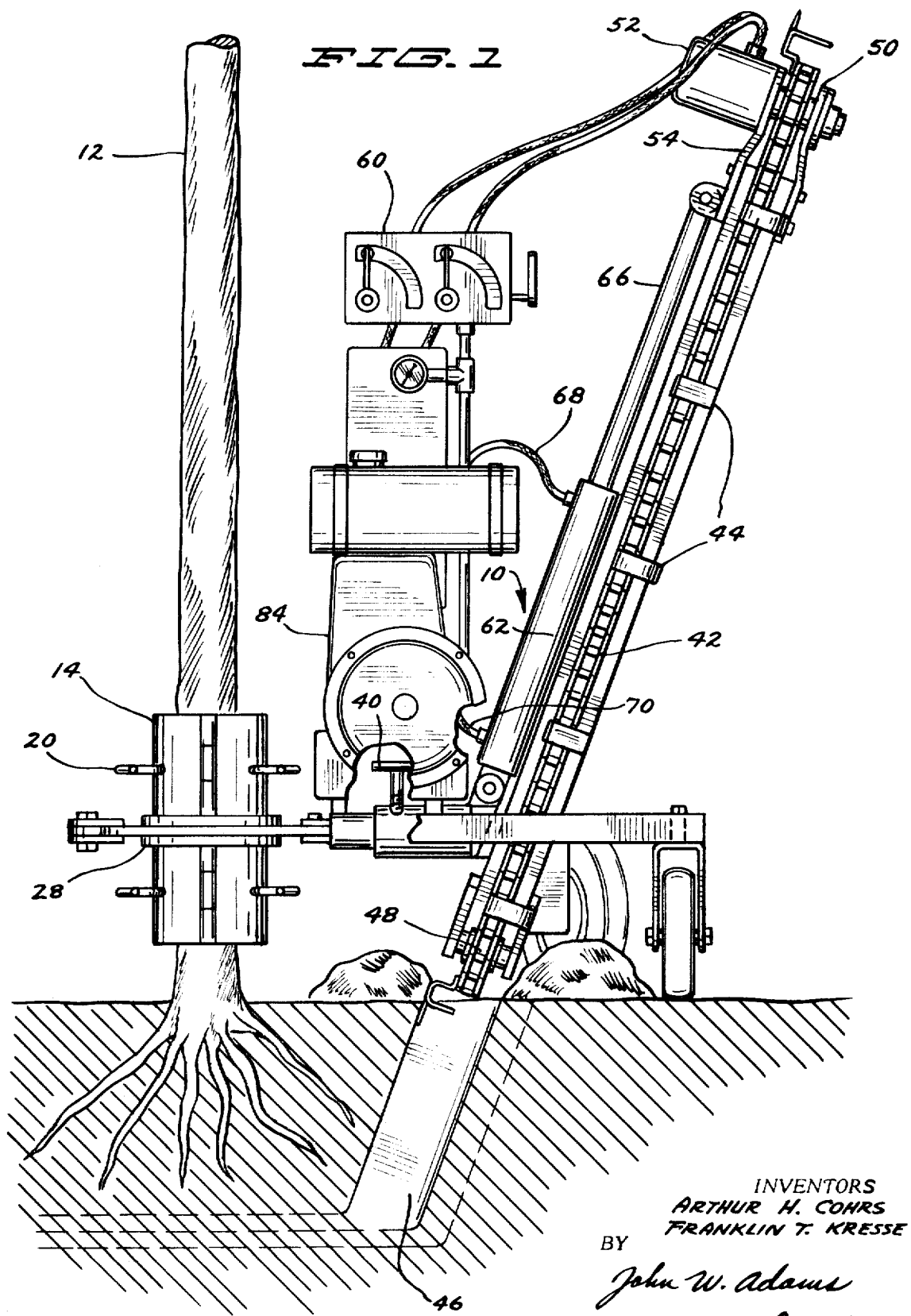
FIG. 1 is a side view of the machine attached to a tree and showing the cutter means in an elevated position relative to a partially excavated trench.
Figure 2:
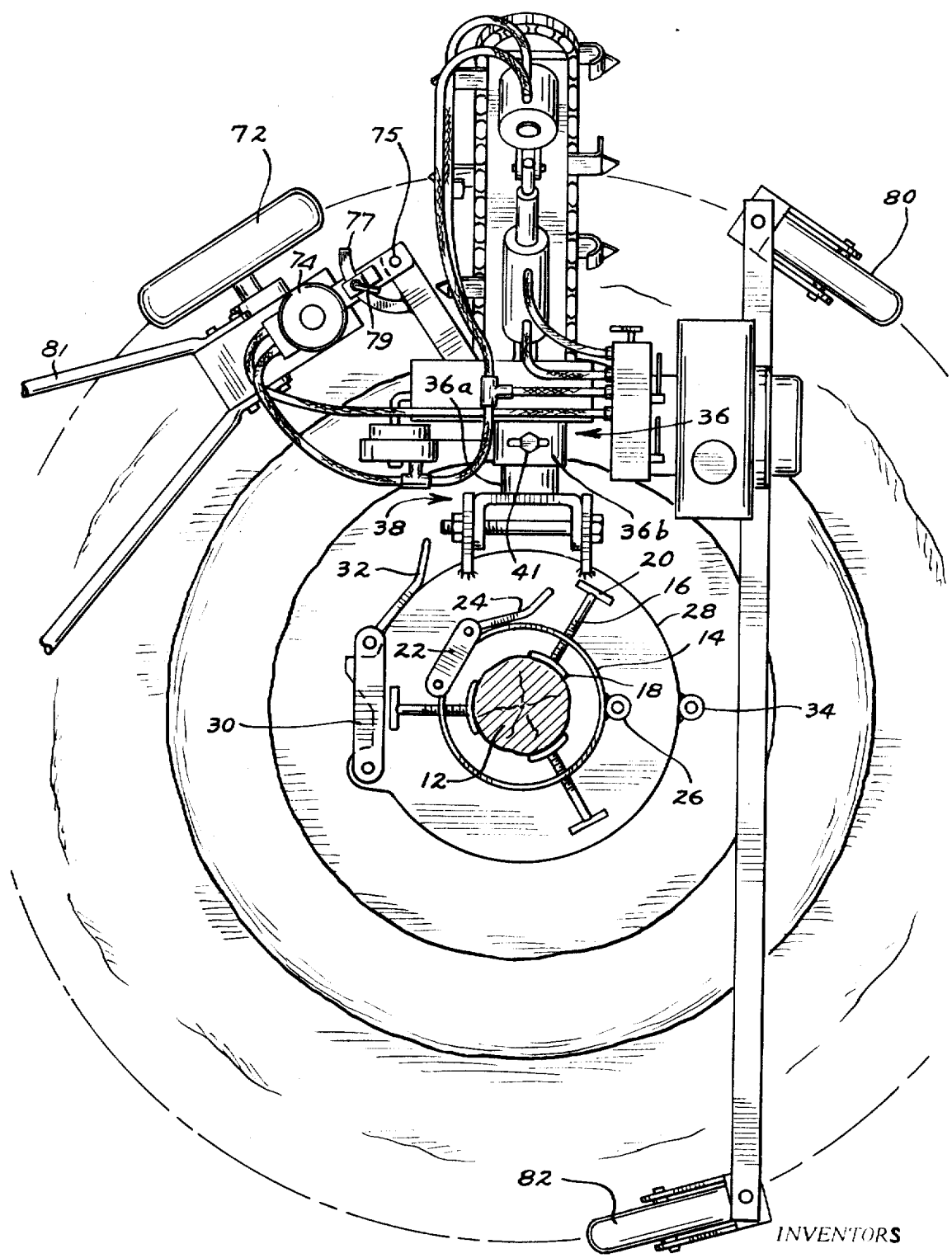
FIG. 2 is a top view.

FIG. 1 shows generally the tree digging mechanism 10 of this invention attached to the base of a tree 12. A split clamping sleeve 14 is mounted on the lower base portion of the tree 12. As shown in FIG. 2, bolts 16 extend through the sleeve 14 to pads 18 which engage the tree trunk 12. Handles 20 are used to turn the bolts 16 thereby tightly clamping the pads 18 against the tree trunk. By securely clamping the pads 18 against the tree trunk a secure positioning of the sleeve is obtained, thereby providing a support for the digging machine. The split clamping sleeve 14 is closed about the tree trunk by means of clamp 22 using handle 24. The hinge 26 allows the sleeve 14 to be opened when the clamp is in the open position and it is desired to secure the sleeve about the trunk of a tree.

A collar 28 is journalled for rotation on the outside of the clamping sleeve 14. This collar is also split so that it can be opened during the anchoring of the machine to the base of a tree. As shown in FIG. 2, a clamp 30 with a handle 32 is used for this purpose. A hinge 34 is located on the collar opposite the clamp so that the collar may be opened when it is positioned about the sleeve on the tree trunk.

A digger support arm 36 is attached to the rotatable collar 28 by means of a hinge 38. In the form shown the length of the arm 36 is telescopically adjustable thereby permitting adjustment of the radius at which the digging portion of the machine is located from the base of the tree to be transplanted.

In the version of the invention shown, an inner member 36a slides in and out within an outer member 36b and a locking pin 40 maintains the adjusted length. It may be seen that the hinge 38 allows an up and down movement of the digger as it rotates about the base of a tree thereby being suitable for the uneven ground which frequently is encountered. For the same reason, the locking pin 40 is inserted in a slot 41 which allows for rotational movement of support arm 36. Depending upon the size of the tree to be removed, it is necessary to adjust the size of the ball of dirt taken with the tree. Extension of support arm 36 allows the machine to be adjusted to allow for a larger diameter ball of dirt to be removed with larger trees.

The digging mechanism of this invention is an endless chain 42 having cutting teeth 44 mounted periodically thereon. As shown in FIGS. 1 and 2, the cutter means are contained solely in an inclined plane that is normal to the vertical plane that contains the support arm 36. The inclined plane is arranged at an acute angle to the vertical axis of the split clamping sleeve, so that when the cutter means is lowered from the elevated position of FIG. 1 to the lowered position of FIG. 3, and the support arm 36 and the collar 28 are rotated about the clamping sleeve 14, a downwardly and inwardly directed frustaconical trench is formed around the root system of the tree. The trench is prepared in this fashion so that a conical ball of dirt may be taken with the tree, this conical section being more easily removable than the ordinary cylindrical core. The endless chain is mounted on an idler sprocket wheel 48 at the lower end and on a drive sprocket 50 at the upper end. In the form of the invention shown a rotary hydraulic drive motor 52 is mounted on a frame 54 to directly drive the drive sprocket 50 and the endless digging chain 42. This frame 54 supports the endless chain and may incorporate some adjustment to permit the tension in the endless chain to be adjusted. The hoses 56 and 58 are coupled to a control unit 60 shown in FIG. 3 which provides a flow of hydraulic fluid to operate the motor 54.

The elevation of the cutter unit with respect to the ground is controlled by hydraulic cylinder 62. The frame 54 rides in the channel which is partially formed by plate 63 which is clamped over the outer edge of the frame. An inner block 64 rides on the inner surface of the frame and another plate 65, partially shown, performs the same function on the interior side of the machine as plate 63 performs on the exterior. Bolts 67 securely anchor the sandwich formed of plates 63 and 65 with block 64 to the main frame of the machine thereby forming a channel in which frame 54 is guided up and down. Extending from the hydraulic cylinder 62 is a rod 66 which is moved back and forth by the hydraulic action of the cylinder. Extending from the cylinder are hydraulic connections 68 and 70 which provide the flow of hydraulic fluid to operate the cylinder.

It can be seen that the use of hydraulic systems on the digging unit greatly facilitates the construction and use of this machine. The use of the hydraulic motor to drive the chain eliminates any problems of coupling power to the chain through belts and pulleys as the flexible hydraulic hoses are moved up and down and move to an incline angle readily. Also the hydraulic cylinder 62 allows the depth of the trench to be readily adjusted. With a larger tree a deeper trench will have to be prepared and the adjustable cylinder allows the machine to be used at any depth as well as the ordinary raising and lowering function when operation is commenced and finished. It is of interest to note that when an obstacle such as a rock is encountered in digging the trench that the hydraulic mechanism will allow the digger to be guided over such an obstacle so long as it does not interfer greatly with the preparation of the trench.

Figure 3:
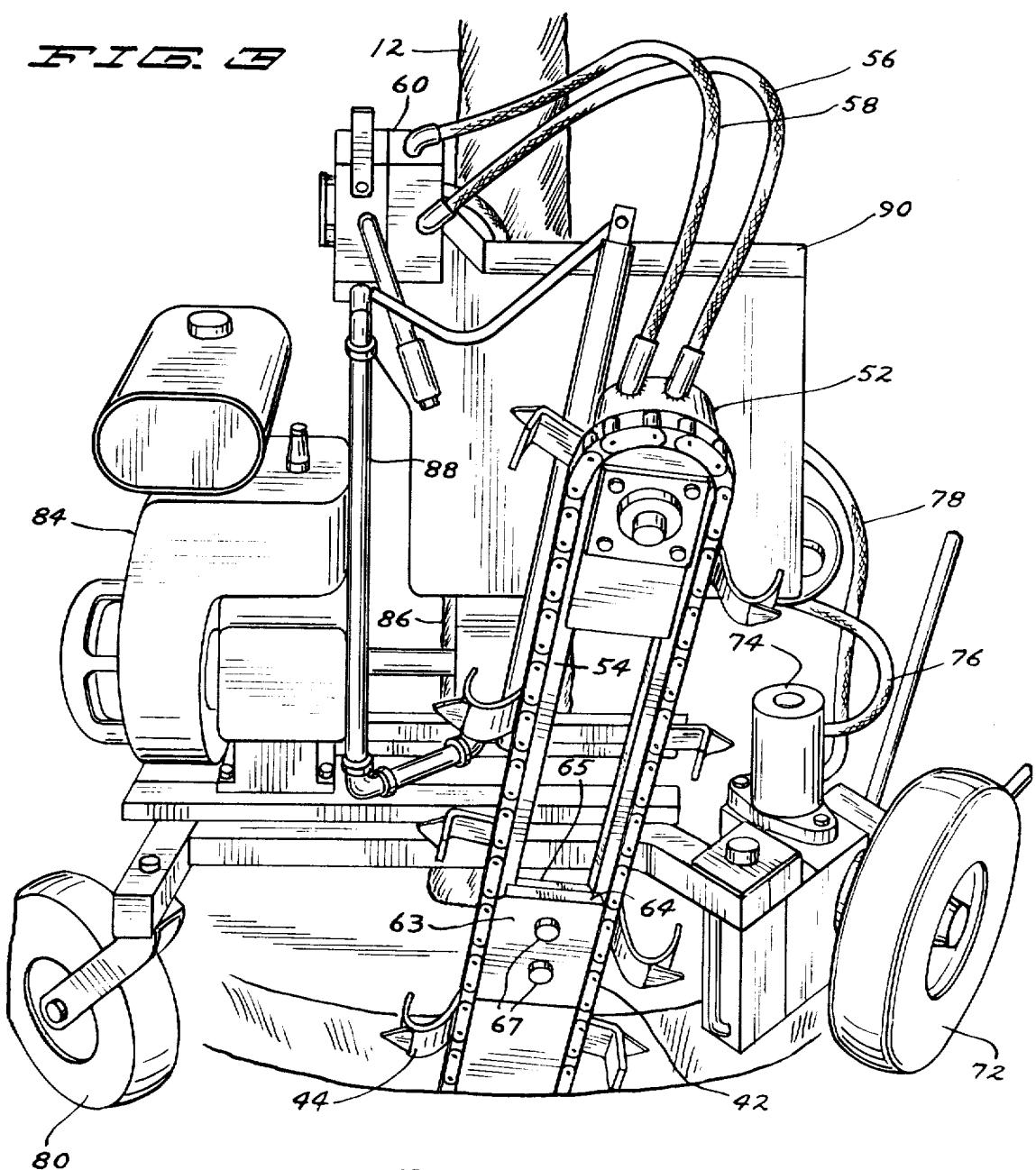
FIG. 3 is a side view showing the digging mechanism in the lowered cutting position.
Figure 4:
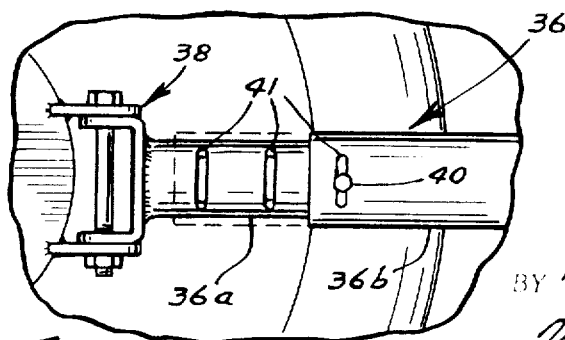
FIG. 4 is a detail view of the extendable arm.

As shown in FIG. 3, a drive wheel 72 may be provided which produces the required force to move the endless chain around its path to dig the trench. This wheel is driven by hydraulic motor 74 coupled by hydraulic hoses 76 and 78 to the control unit 60. The drive wheel is steerable, being mounted on pivot 75. As shown in FIG. 2, the drive wheel is locked in the desired steering position by locking clamp 79 on arcuate member 77. Also when the machine is not attached to a tree for removal thereof, this power wheel allows the operator to move the machine from one location to another. The operator of the machine can use handle 81 to control the position of the steering wheel 72.

Follower wheels 80 and 82 are provided to help carry the weight of the machine. These wheels are mounted so that they follow the rotation of the machine about a tree. They may be locked for traveling so that the machine goes in a path controlled by steering the drive wheel.

In the form illustrated, an ordinary gasoline motor 84 drives a hydraulic pump 86. The flow from the hydraulic pump is conducted to the control unit 60 through pipe 88. The speed of hydraulic motors 52 and 74 is continuously adjustable by means of the valves in control unit 60. A reservoir 90 contains hydraulic fluid which has been returned from the system and which is ready to enter the pump. It will, of course, be recognized that the source of hydraulic fluid flow for the control unit 60 need not necessarily be provided by a motor integral with the tree digging machine. An embodiment of this invention employing the inventive principles herein described may be made using an ordinary tractor or some other mechanism having a hydraulic fluid pump coupled to the control unit 60.

The operation of the machine will now be explained. The operator initially drives the machine to the proper position at the base of a tree using the drive wheel 72 and the hydraulic motor 74. Then the operator secures the sleeve 14 about the tree by closing clamp 22 and the tightening bolts 16 so that the pads 18 provide a rigid connection with the tree. Thus the sleeve 14 becomes rigid with respect to the tree. Collar 28 is similarly placed in the proper position on the sleeve 14 and the clamp 30 is closed. At this time the tree digger is rigidly mounted to the tree. Next the operator of the machine commences the operation of the endless chain digger and then gradually lowers it to the desired digging depth. Once the digger is at the proper depth the operator moves the cutting members into the earth by activating the driving wheel 72. When the trench is complete the operator reverses the steps used to secure the machine to the tree and moves the machine away leaving the tree ready to be lifted out of the ground and placed on a vehicle for transportation. It will be appreciated that the operator of the machine may adjust the length of the arm member 36 to produce a trench of the desired diameter. The depth of the trench may be adjusted at any time during the digging operation.

It will, of course, be understood that various changes may be made in the form, details, arrangement and proportion of the parts without departing from the scope of the invention, which generally stated, consists in the matter set forth in the accompanying claims.

What is claimed is:

1. Tree excavating apparatus for digging a downwardly convergent frustaconical trench concentrically about the root portion of a tree, comprising
   a. stationary clamping sleeve means adapted for rigid clamping concentrically about the trunk of the tree;
   b. annular collar means concentrically mounted for rotation about said clamping sleeve means;
   c. generally horizontal support arm means connected at one end with and radially extending outwardly from said collar means;
   d. ground-engaging wheel means for supporting said support arm means at a given generally horizontal orientation relative to the ground, said wheel means being arranged to permit rotation of said support arm means and said collar means around said sleeve means; and
   e. rotatably-driven endless trench cutter means connected with said support arm means for digging a trench around said tree, said trench cutter means being contained solely in an inclined plane that is:
      1. normal to the vertical plane containing said support arm means, and
      2. inclined at an upwardly divergent acute angle relative to the vertical axis of said clamping sleeve means,
   whereby upon rotation of said support arm means about said clamping sleeve means, said cutter means will dig an inwardly convergent trench around said tree to enclose the root system thereof within a frustaconical ball of earth.

2. Apparatus as defined in claim 1, and further including means connecting said trench cutter means with said support arm means for vertical adjustment longitudinally of the line of intersection between said vertical and inclined planes, thereby to permit variation of the depth of the trench formed around the tree.

3. Apparatus as defined in claim 2, wherein said trench cutter means comprises endless cutter chain means the axis of operation of which is colinear with said line of intersection between said vertical and inclined planes, and further wherein said means connecting said trench cutter means for vertical adjustment relative to said support arm means comprises slide channel means.

4. Apparatus as defined in claim 3, wherein said vertical adjustment means further includes piston and cylinder motor means connected between said trench cutter means and said support arm means, said motor means extending parallel with the line of intersection between said vertical and inclined planes.

5. Apparatus as defined in claim 1, wherein said support arm means is sectional and of variable length, and further including means for adjusting the length of said arm to vary the radius of the resultant frustaconical trench.

6. Apparatus as defined in claim 3, and further wherein said ground-engaging wheel means includes at least one wheel pivotally connected with said support arm means for movement about a vertical pivot axis, thereby to accommodate adjustment in length of said support arm means.

7. Apparatus as defined in claim 6, and further including rotary motor means for driving said one wheel, and lock means for maintaining said one wheel in a given angular orientation relative to said support arm means.

8. Apparatus as defined in claim 1, and further including rotary motor means for driving said wheel means to transport said support arm means and said trench cutter means about the clamping sleeve means.

9. Apparatus as defined in claim 1, and further including hinge means connecting said support arm means with said collar means for pivotal movement about a horizontal pivot axis.

* * * * *